United States Patent [19]

McConomy et al.

[11] 4,297,334
[45] Oct. 27, 1981

[54] PROCESS FOR REMOVING COLOR BODIES FROM BROWN PHOSPHORIC ACID

[75] Inventors: Thomas A. McConomy, Coraopolis; Bruce D. Wells, Pittsburgh, both of Pa.

[73] Assignee: Calgon Corporation, Pittsburgh, Pa.

[21] Appl. No.: 174,979

[22] Filed: Aug. 4, 1980

Related U.S. Application Data

[63] Continuation-in-part of Ser. No. 93,347, Nov. 13, 1979, abandoned, which is a continuation-in-part of Ser. No. 13,495, Feb. 21, 1979, abandoned.

[51] Int. Cl.³ .............................................. C01B 25/16
[52] U.S. Cl. ................................................. 423/321 R
[58] Field of Search .................... 423/319, 320, 321 S, 423/321 R; 252/444

[56] References Cited

U.S. PATENT DOCUMENTS

| | | |
|---|---|---|
| 3,122,415 | 2/1964 | Gilchrist ............................. 423/320 |
| 3,186,793 | 6/1965 | Gillis et al. ...................... 423/321 R |
| 3,634,028 | 1/1972 | Hohne ................................ 252/444 |
| 3,872,215 | 3/1975 | Cherdron et al. .................. 423/309 |
| 3,993,733 | 11/1976 | Irani .................................... 423/313 |
| 3,993,736 | 11/1976 | Irani ................................. 423/321 S |
| 4,029,600 | 6/1977 | Schmitt et al. ...................... 252/444 |

FOREIGN PATENT DOCUMENTS

| | | |
|---|---|---|
| 51-442919 | 7/1976 | Japan . |
| 1103224 | 2/1968 | United Kingdom ............ 423/321 R |

*Primary Examiner*—O. R. Vertiz
*Assistant Examiner*—Gregory A. Heller
*Attorney, Agent, or Firm*—Mario A. Monaco; Martin L. Katz; R. Brent Olson

[57] ABSTRACT

A system and process for decolorizing and purifying brown phosphoric acid using an activated carbon characterized by having a total pore volume of 1.0 cc/g or greater with about half of the total pore volume located in pores 35Å or less in radius.

2 Claims, 1 Drawing Figure

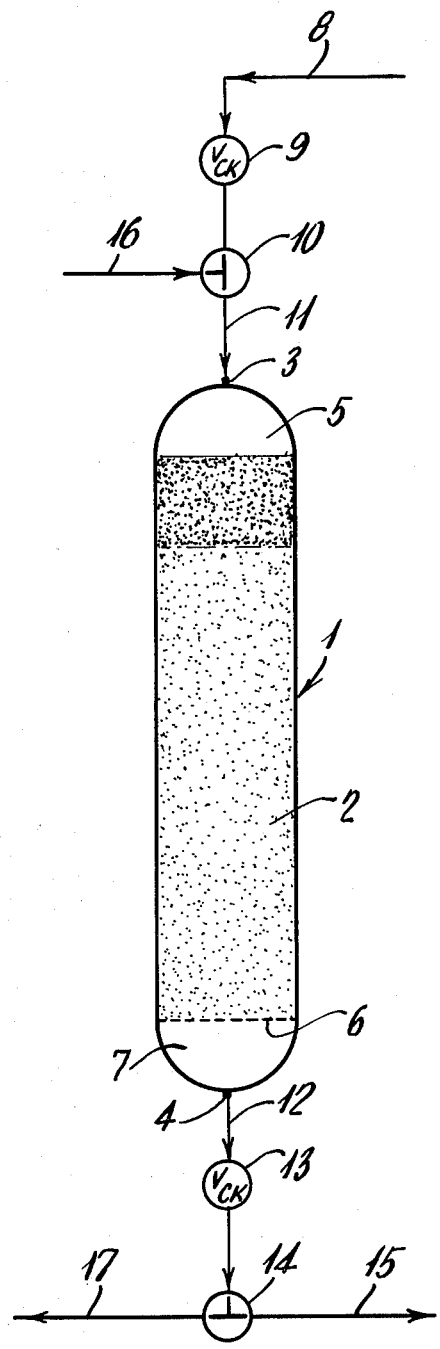

PROCESS FOR REMOVING COLOR BODIES FROM BROWN PHOSPHORIC ACID

This is a continuation-in-part application of U.S. Ser. No. 093,347, filed Nov. 13, 1979, now abandoned which is a continuation-in-part application of U.S. Ser. No. 013,495, filed Feb. 21, 1979, now abandoned.

DISCLOSURE OF THE INVENTION

This invention relates to an improved process for decolorizing brown phosphoric acid obtained by the "wet acid process" by using activated carbon characterized by having a total pore volume of 1.0 cc/g or greater with about half of the total pore volume located in pores 35 Å or less in radius.

BACKGROUND OF THE INVENTION

In the past, high purity phosphoric acid or alkali metal phosphates including, for example, trisodium phosphate, sodium tripolyphosphate, tetrasodium pyrophosphate and disodium phosphate were prepared by the thermal acid method described in Slack, Phosphoric Acid, V. 1, pp. 927–966, Marcel Dekker, Inc. (1968). The phosphoric acid and phosphates used in food, pharmaceuticals and in the processing of foods and pharmaceuticals must, within stringent limits, be substantially free from arsenic, fluorides, heavy metals and general contaminants referred to as insolubles.

The thermal process for producing these highly pure food and pharmaceutical grade phosphoric acid provides extremely pure phosphoric acid, but requires extensive capital investment for equipment, together with a large input of energy and pollution control equipment. Until recently, the inability to confidently and consistently remove contaminants made electrothermal phosphoric acid prepared from elemental phosphorous the predominant source of such high purity phosphoric acid.

The so-called wet process employing phosphate rock and sulfuric acid is well known in the art and is described in Waggamen, Phosphoric Acid, Phosphates and Phosphatic Fertilizer, pp. 174–209, Hafner Publishing Co. (2nd Ed., 1969). The wet process is also broad enough to include acids other than sulfuric, including nitric and hydrochloric acid. This is described in Slack, Phosphoric Acid, V. 1, Part 2, pp. 889–926, Marcel Dekker, Inc. (1968).

The wet process produces a reasonably pure phosphoric acid, but one containing many contaminants that made it most suitable for such end uses as fertilizer and the like.

Many processes were proposed to remove the contaminants found in wet process phosphoric acid and substantially all the successful processes employ activated carbon. For example, see U.S. Pat. No. 3,993,733; U.S. Pat. No. 3,872,215; U.S. Pat. No. 3,993,736; U.S. Pat. No. 3,122,415; and British Pat. No. 1,442,919. Unfortunately, the phosphate rock impurities are found to deactivate the porous activated carbon and because sufficient of these impurities are inorganic, thermal regeneration of the activated carbon is unsuitable because phosphate glasses fuse to the pores of the activated carbon. Thus, the inability to suitably regenerate the activated carbon precluded its adoption in a commercial process on a cost competitive basis. Since the use of activated carbon was the key to so many successful processes for upgrading wet process phosphoric acid, extending the capacity of the activated carbon is a clearly desirable goal.

Improved regeneration techniques have increased the total number of useful cycles obtainable from a batch of activated carbon when used in the purification of wet process brown phosphoric acid. However, the total number of useful cycles available in no way increases the capacity of the activated carbon. Increase of capacity is especially important since as capacity increases, plant capacity increases, thereby decreasing capital costs per unit of output. Furthermore, the frequency of regeneration can be decreased with increased decolorizing capacity thereby saving down time and other nonproductive operating costs. This extension results in less down time and more acid processed per unit of activated carbon.

Implementing the process of this invention results in helping to make wet process phosphoric acid the equivalent of thermal elemental phosphoric acid, and in making processes using activated carbon into commercially feasible ventures.

DETAILED DESCRIPTION OF THE INVENTION

In the drawing, there is shown a housing for activated carbon employed in the system and process of this invention.

The nature and content of the impurities that poison the activated carbon and dissipate its effectiveness are only partially understood. They mostly comprise gypsum that precipitates from the brown phosphoric acid, earth waxes, and humic acids together with heavy metal salts, for example, arsenic, lead and the like, as well as fluoride salts and complex silicates. Indeed, the exact nature of the contaminants is difficult to state with precision since the composition of the raw phosphate rock will differ with the run of the mine and even more widely from mine to mine. Also, the sulfur employed to produce the sulfuric acid will, itself, contain various impurities that carry over to poison, clog or otherwise exhaust the activated carbon. In addition, the wearing of the crushing surfaces of processing equipment employed to pulverize the rock can also introduce impurities that appear in the brown acid.

In the production of brown acid, phosphate-containing rock, usually predominantly calcium phosphate, is pulverized and digested with mineral acid. The rock material is a mixture of overburden and organic material running through the veins. Generally, in the digestion, sulfuric acid is employed producing large quantities of calcium sulfate. This slowly precipitates as gypsum. Other mineral acids are suitable and on some occasions, employed in the production of phosphoric acid. These other mineral acids also produce contaminants and physical deposits similar to those found in the process when sulfuric acid is employed, except, of course, gypsum is for the most part absent.

The raw brown acid that usually comes from the wet process digestion is usually about 28 percent to 34 percent and sometimes higher (expressed in weight of $P_2O_5$ content). The brown acid is usually put through a separation step to remove gross particles of gypsum and often a solids contact unit clarifier to further remove residual solids. This intermediate processing can also be employed to neutralize the crude phosphoric acid to alkali metal phosphates.

It is this point, that there is suitably employed one or more activated carbon purification steps. In the purification, the brown phosphoric acid is, by gravity or by pressure, filtered through a bed or column of activated carbon.

Referring now to the drawing in detail, there is shown an assembly for decolorizing and purifying brown phosphoric acid comprising a housing 1 containing an activated carbon 2 of the type described herein. Housing 1, as is the entire assembly, is constructed from a material resistant to the corrosive action of phosphoric acid in particular and generally resistant to attack from substances ordinarily employed in the processing of phosphoric acid.

At the top of housing 1 there is an inlet 3 for the entry of impure brown phosphoric acid. At the bottom of housing 1, there is an outlet 4 for the egress of purified decolorized phosphoric acid from housing 1 after its passage through activated carbon 2. It is preferred that activated carbon 2 not entirely fill the interior space of housing 1 but that a fluid or head space be retained at the upper portion 5 to adsorb any sudden or unexpected changes in pressure. Similarly, a retention screen 6 holds the activated carbon over pressure adsorption space 7.

During operation, brown phosphoric acid is pumped by a suitable means not shown through line 8, thence through check valve 9, three-way valve 10, line 11 and finally through inlet 3 into the interior of housing 1. Check valve 9 is optional, but is desirable to prevent back-flow of any unwanted fluids into line 8. The brown phosphoric acid passes through activated carbon 2 and until activated carbon 2 is exhausted, leaves outlet 4 in purified form. The purified phosphoric acid then passes through line 12, check valve 13, and three-way valve 14 and via line 15 to a suitable storage means or a further processing step. Lines 16 and 17 are employed for supply and of regenerating fluids during the regeneration cycle of the activated carbon 9, when valves 10 and 14 are set to block flow of acid through housing 1, and permit flow through lines 16 and 17.

The activated carbon employed can be derived from bituminous coal, lignite, peat, coconut shells, from wood sources or from petroleum acid sludge, or coke and it was heretofore thought unnecessary to employ any particular pore size or mesh size. Generally, the so-called liquid phase activated carbons were employed since their pore size distribution was believed sufficiently large to allow for easy access of liquids to the interior of the pores. Generally, the previously preferred activated carbons were granular and had a total surface area of 500 to 1200 m²/g. and more preferably, 500 to 1100 m²/g.

In employing the activated carbon of this invention, a residence time of the brown phosphoric acid of from $\frac{1}{3}$ to 3 hours in the activated carbon is satisfactory, while 1½ hours is most desirable. When the existing phosphoric acid is no longer green, but starts to take on a brown tinge or if such a lengthy residence time is required that production is hampered or color specifications are exceeded, it is time to regenerate the carbon in the usual manner.

It is now found that an activated carbon having a vastly superior capacity for purifying brown phosphoric acid is characterized by having a total pore volume of 1.0 cc/g or greater than about half of the total pore volume located in pores 35 Å or less in radius. A more preferred activated carbon has a total pore volume of 1.2 to 1.4 cc/g or greater with about half of the total pore volume located in pores 35 Å or less in radius.

Such activated carbons increase in capacity as shown in the accompanying tables where an activated carbon having the above characteristics is compared with activated carbons having characteristics heretofore regarded as otherwise peculiarly suitable for removal of color bodies and other impurities from a typical brown phosphoric acid by means of adsorption isotherms. The methods and interpretation of adsorption isotherms is well accepted in the art and are outlined in "The Laboratory Evaluation of Granular Activated Carbons for Liquid Phase Applications", Activated Carbon Division Calgon Corporation Publication No. 23–60, filed herewith and incorporated herein by references. In the tables, the isotherms obtained are as follows:

When x/m is plotted versus C on log paper, the following theoretical values are obtained in terms of grams of activated carbon required to decolorize 100 grams of the brown phosphoric acid sampled.

| Carbon A | .310 g |
| Carbon B | .098 g |
| Carbon C | .370 g |

TABLE I

| | Carbon A | | | | Carbon B | | | | Carbon C | | |
|---|---|---|---|---|---|---|---|---|---|---|---|
| gms. | C | X | X/M | gms. | C | X | X/M | gms. | C | X | X/M |
| 0.1 | 2.1 | 0.82 | 8.2 | 0.1 | .88 | 1.57 | 15.7 | 0.1 | 3.13 | 0.28 | 2.8 |
| 0.2 | 1.48 | 1.44 | 7.2 | 0.2 | .603 | 1.85 | 9.2 | 0.2 | 2.26 | 1.15 | 5.8 |
| 0.3 | 1.05 | 1.83 | 6.1 | 0.3 | .340 | 2.10 | 7.0 | 0.3 | 1.41 | 2.00 | 6.7 |
| 0.5 | 0.511 | 2.33 | 4.7 | 0.5 | .243 | 2.21 | 4.4 | 0.5 | 0.965 | 2.55 | 5.1 |
| 1.0 | 0.189 | 2.73 | 2.7 | 1.0 | .185 | 2.27 | 2.3 | 1.0 | 0.389 | 3.02 | 3.0 |
| 2.0 | 0.190 | 2.72 | 1.4 | 2.0 | .157 | 2.3 | 1.1 | 2.0 | 0.239 | 3.17 | 1.6 |

Table II shows the physical properties of Carbon Samples A, B and C.

TABLE II

| Carbon | 0-884Å Radius Net Pore Volume cc./g. | Average Pore Radius In Å | Surface Area m²/g. |
|---|---|---|---|
| A | 0.4766 | 120 | 1132.9 |
| B | 0.6178 | 330 | 1627.9 |
| C | 0.6416 | 480 | 765.8 |

A more precise definition of the improved decolorization properties of the preferred activated carbons of this invention is set forth in Table III, where the pore size distribution of prior art activated carbons and the activated carbons of the present invention are set forth and the decolorization abilities of these carbons with respect to brown phosphoric acid are evaluated. The pore size distributions are determined by standard techniques using a Model 900/910 Series Mercury Porosimeter. An examination of the isothermal capacity data demonstrates he improved results that are obtained with the activated carbons of the instant invention.

TABLE III

| Carbon | Surface Area m²/g. | Total Pore Volume cc./g. | Pore Volume <500Å cc./g. | Pore Volume <50Å cc./g. | Pore Volume <17.5Å cc./g. | Isotherm Capacity $\left(\frac{x}{m}\right)_{C_0}$ | Pore Volume/ Radius 17.5 to 500Å cc./g. |
|---|---|---|---|---|---|---|---|
| A | 1133 | 0.820 | 0.54 | 0.42 | 0.34 | 2.9 | 0.20 |
| B | 766 | 0.820 | 0.50 | 0.34 | 0.18 | 4.1 | 0.32 |
| C | 1329 | 1.247 | 0.85 | 0.56 | 0.36 | 10.9 | 0.49 |
| D | 1209 | 1.186 | 0.80 | 0.57 | 0.36 | 8.8 | 0.44 |
| E | 1085 | 0.996 | 0.70 | 0.48 | 0.30 | 6.6 | 0.40 |

The pore size distribution of the carbons of this invention may also be characterized by the Dubinin method. The data for a representative carbon of this invention is set forth in Table IV.

TABLE IV
DUBININ PLOT DATA

| VOL, cc/g | DIA, Å | r, Å | LOG r | ln r | dln r | $\frac{dv}{d\ln r}$ |
|---|---|---|---|---|---|---|
| .05 | 12.5 | 6.25 | 0.796 | 1.833 | | |
| .10 | 14.0 | 7 | 0.845 | 1.946 | 0.113 | 0.442 |
| .15 | 15.0 | 7.5 | 0.875 | 2.015 | 0.069 | 0.725 |
| .20 | 16.0 | 8 | 0.903 | 2.079 | 0.064 | 0.71 |
| .25 | 16.5 | 8.25 | 0.916 | 2.110 | 0.031 | 1.613 |
| .30 | 17.0 | 8.5 | 0.929 | 2.140 | 0.030 | 1.667 |
| .35 | 17.5 | 8.75 | 0.942 | 2.169 | 0.029 | 1.724 |
| .40 | 18.0 | 9 | 0.954 | 2.197 | 0.028 | 1.786 |
| .45 | 20.0 | 10 | 1.000 | 2.303 | 0.106 | 0.472 |
| .50 | 22.5 | 11.25 | 1.051 | 2.420 | 0.117 | 0.427 |
| .55 | 25.0 | 12.5 | 1.097 | 2.526 | 0.106 | 0.472 |
| .60 | 30.0 | 15 | 1.176 | 2.708 | 0.182 | 0.275 |
| .65 | 34.0 | 18.5 | 1.267 | 2.918 | 0.210 | 0.238 |
| .70 | 50.0 | 25 | 1.398 | 3.219 | 0.310 | 0.166 |
| .75 | 70.0 | 35 | 1.544 | 3.555 | 0.336 | 0.149 |
| .80 | 110.0 | 55 | 1.740 | 4.007 | 0.452 | 0.111 |
| .85 | 170.0 | 85 | 1.929 | 4.443 | 0.436 | 0.115 |
| .90 | 300.0 | 150 | 2.176 | 5.011 | 0.568 | 0.088 |
| .95 | 500.0 | 250 | 2.398 | 5.521 | 0.510 | 0.098 |
| 1.00 | 1,200.0 | 600 | 2.778 | 6.397 | 0.876 | 0.057 |
| 1.05 | 3,000.0 | 1,500 | 3.176 | 7.313 | 0.916 | 0.055 |
| 1.10 | 5,700.0 | 2,850 | 3,455 | 7.955 | 0.642 | 0.078 |
| 1.15 | 10,000.0 | 5,000 | 3.699 | 8.517 | 0.562 | 0.089 |
| 1.20 | 20,000.0 | 10,000 | 4.000 | 9.210 | 0.693 | 0.072 | ln r is the natural logarithm of the radius (Å); wherein
dv is the incremental change in pore volume (cc/g); and;
dln r is the incremental change in the natural logarithm of the radius (Å).

Examples of such activated carbons are well known in the art, but the preferred activated carbon is prepared as follows.

To prepare the activated carbon of this invention, a charred carbonaceous material is pulverized to a mesh size wherein at least 60 percent of the pulverized material will pass through a 325 mesh screen (U.S. Standard). The pulverized material then is mixed with about 6 to 10 percent by weight of pitch or other carbonaceous binder, which is also pulverized, and the mixture is aggomerated or formed by compression into shapes, which, in turn, are crushed and screened to a mesh of about 4×12 (U.S. Standard).

The granular material thus obtained then is air oxidized at a temperature of from 200° F. to 900° F. for a period of 240 to 360 minutes. Air is introduced into the oxidation zone in accordance with the teachings of the prior art. The material so baked is then activated by steam at temperatures ranging from 1750° F. to 1850° F., preferably at 1800° F. to 1825° F. The duration of activation is governed by the activity of the final product desired.

A generally preferred preparation of the feed material may be described as follows. The raw coal material first is pulverized to 75 percent less than 325 mesh. Then 9 percent by weight pitch is added in the pulverizer. The mixture is then briquetted or agglomerated and subsequently crushed to a granular mesh of about 4×12. This material then is activated by the method described above.

A detailed illustrative example of the preparation of the activated carbon for treatment of phosphoric acid is as follows:

EXAMPLE 1

One hundred parts of a bituminous coal containing ash, 25 percent to 35 percent volatile material (VM), and 3 percent to 8 percent moisture was mixed with 9 parts of coal tar pitch having a softening range of 80° C. to 115° C. and was pulverized until the product contained about 75 percent that passed through 325 mesh U.S. Standard Sieve. The material was briquetted, crushed, and sized to 4×12 mesh (U.S.S.) granules. The sized material was oxidized/calcined by air at temperatures between 300° F. to 900° F. for a total of 240 minutes. The baked material was then activated at 1820° F. in an atmosphere containing 40 percent to 60 percent water vapor and carbon dioxide and the balance nitrogen. The activation of the oxidized/calcined material was conducted in a multiple hearth furnace where the effective exposure of carbon to activating gases were controlled between 240 to 300 minutes by adjusting the carbon feed rate and the furnace shaft speed. The material discharging from the furnace was cooled and crushed to yield (6×16) mesh granular product. Properties of the coal as it went through the process is shown below:

| | Oxidation Calcination | Activation |
|---|---|---|
| Active Density, g./cc. | 0.7–0.75 | 0.35 |
| Volatile Matter, Percent/Weight | 16 | 0 |

We claim:

1. In a process for purifying brown phosphoric acid by means of filtration through activated carbon and recovering the phosphoric acid wherein the improvement consists of filtering the brown phosphoric acid through a bed of activated carbon having a total pore volume of 1.0 cc/g or greater with about half of the total pore volume located in pores 35 Å or less in radius.

2. A process according to claim 1 wherein the carbon has a total pore volume of from 1.2 to 1.4 cc/g or greater with about half of the total pore volume located in pores 35 Å or less in radius.

* * * * *